(12) United States Patent
Gupta et al.

(10) Patent No.: US 7,734,800 B2
(45) Date of Patent: Jun. 8, 2010

(54) MULTIMEDIA TIMELINE MODIFICATION IN NETWORKED CLIENT/SERVER SYSTEMS

(75) Inventors: Anoop Gupta, Woodinville, WA (US); Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1483 days.

(21) Appl. No.: 10/647,547

(22) Filed: Aug. 25, 2003

(65) Prior Publication Data

US 2004/0039837 A1 Feb. 26, 2004

Related U.S. Application Data

(63) Continuation of application No. 09/153,664, filed on Sep. 15, 1998, now Pat. No. 6,622,171.

(51) Int. Cl.
*G06F 15/16* (2006.01)
*H04N 9/475* (2006.01)

(52) U.S. Cl. .................. 709/231; 709/236; 348/515

(58) Field of Classification Search ......... 348/441–459, 348/500–551, 384.1, 385.1, 423.1, 575, 722; 709/231, 236
See application file for complete search history.

(56) References Cited

U.S. PATENT DOCUMENTS

| | | | |
|---|---|---|---|
| 4,931,950 A | 6/1990 | Isle et al. | |
| 5,050,161 A | 9/1991 | Golestani | |
| 5,119,474 A | 6/1992 | Beitel et al. | |
| 5,175,769 A | 12/1992 | Hejna | |
| 5,274,758 A | 12/1993 | Beitel et al. | |
| 5,309,562 A | 5/1994 | Li | |
| 5,313,454 A | 5/1994 | Bustini et al. | |
| 5,341,474 A | 8/1994 | Gelman et al. | |
| 5,414,455 A | 5/1995 | Hooper et al. | |
| 5,420,801 A | 5/1995 | Dockter | |
| 5,434,848 A | 7/1995 | Chimento, Jr. et al. | |
| 5,455,910 A | 10/1995 | Johnson et al. | |
| 5,481,542 A | 1/1996 | Logston et al. | |
| 5,490,252 A | 2/1996 | Macera et al. | |
| 5,504,744 A | 4/1996 | Adams et al. | |
| 5,519,701 A | 5/1996 | Colmant et al. | |
| 5,521,630 A | 5/1996 | Chen et al. | |
| 5,533,021 A | 7/1996 | Branstad et al. | |

(Continued)

FOREIGN PATENT DOCUMENTS

EP 0605115 7/1994

(Continued)

OTHER PUBLICATIONS

Arons, Barry, "SpeechSkimmer: A System for Interactively Skimming Recorded Speech," ACM Transactions on Computer-Human, vol. 4, No. 1, pp. 3-38.

(Continued)

*Primary Examiner*—Peling A Shaw
(74) *Attorney, Agent, or Firm*—Perkins Coie LLP

(57) ABSTRACT

Multimedia content is streamed over a network system from a server computer to a client computer. The client allows a user to enter a variable playback speed and varies the speed at which the multimedia content is rendered at the client. Time-scale modification technology is used to maintain the original pitch of any audio content, thereby maintaining its intelligibility.

7 Claims, 9 Drawing Sheets

U.S. PATENT DOCUMENTS

| | | | |
|---|---|---|---|
| 5,537,408 | A | 7/1996 | Branstad et al. |
| 5,541,955 | A | 7/1996 | Jacobsmeyer |
| 5,559,942 | A | 9/1996 | Gough et al. |
| 5,566,175 | A | 10/1996 | Davis |
| 5,574,724 | A | 11/1996 | Bales et al. |
| 5,614,940 | A | 3/1997 | Cobbley et al. |
| 5,617,423 | A | 4/1997 | Li et al. |
| 5,623,690 | A | 4/1997 | Palmer et al. |
| 5,625,405 | A | 4/1997 | DuLac et al. |
| 5,640,320 | A | 6/1997 | Jackson et al. |
| 5,642,497 | A | 6/1997 | Crary |
| 5,652,627 | A | 7/1997 | Allen |
| 5,664,227 | A | 9/1997 | Mauldin et al. |
| 5,692,213 | A | 11/1997 | Goldberg et al. |
| 5,692,313 | A | 12/1997 | Ikeda et al. |
| 5,717,691 | A | 2/1998 | Dighe et al. |
| 5,717,869 | A | 2/1998 | Moran et al. |
| 5,719,786 | A | 2/1998 | Nelson et al. |
| 5,721,829 | A | 2/1998 | Dunn et al. |
| 5,742,347 | A | 4/1998 | Kandlur et al. |
| 5,768,533 | A | 6/1998 | Ran |
| 5,786,814 | A | 7/1998 | Moran et al. |
| 5,793,980 | A | 8/1998 | Glaser |
| 5,794,210 | A | 8/1998 | Goldhaber et al. |
| 5,794,249 | A | 8/1998 | Orsolini et al. |
| 5,799,292 | A | 8/1998 | Hekmatpour |
| 5,801,685 | A | 9/1998 | Miller et al. |
| 5,808,662 | A | 9/1998 | Kinney et al. |
| 5,815,689 | A | 9/1998 | Shaw et al. |
| 5,818,510 | A | 10/1998 | Cobbley et al. |
| 5,822,537 | A * | 10/1998 | Katseff et al. ............... 709/231 |
| 5,828,848 | A | 10/1998 | MacCormack et al. |
| 5,832,437 | A | 11/1998 | Nishiguchi et al. |
| 5,835,495 | A | 11/1998 | Ferriere |
| 5,835,667 | A | 11/1998 | Wactlar et al. |
| 5,838,906 | A | 11/1998 | Doyle et al. |
| 5,842,172 | A | 11/1998 | Wilson |
| 5,852,705 | A | 12/1998 | Hanko |
| 5,859,641 | A | 1/1999 | Cave |
| 5,864,682 | A | 1/1999 | Porter et al. |
| 5,870,755 | A | 2/1999 | Stevens et al. |
| 5,873,735 | A | 2/1999 | Yamada et al. |
| 5,880,788 | A | 3/1999 | Bregler |
| 5,892,506 | A | 4/1999 | Hermanson |
| 5,893,053 | A * | 4/1999 | Trueblood ................. 702/187 |
| 5,893,062 | A * | 4/1999 | Bhadkamkar et al. ....... 704/270 |
| 5,903,673 | A | 5/1999 | Wang et al. |
| 5,918,002 | A | 6/1999 | Klemets et al. |
| 5,930,787 | A | 7/1999 | Minakuchi et al. |
| 5,941,936 | A | 8/1999 | Taylor |
| 5,953,506 | A * | 9/1999 | Kalra et al. ................. 709/231 |
| 5,956,716 | A | 9/1999 | Kenner et al. |
| 5,995,941 | A | 11/1999 | Maquire et al. |
| 5,999,979 | A | 12/1999 | Vellanki et al. |
| 6,006,241 | A | 12/1999 | Purnaveja et al. |
| 6,014,706 | A | 1/2000 | Cannon et al. |
| 6,023,731 | A | 2/2000 | Chawla |
| 6,032,130 | A | 2/2000 | Alloul et al. |
| 6,035,341 | A | 3/2000 | Nunally et al. |
| 6,041,345 | A | 3/2000 | Levi et al. |
| 6,049,823 | A | 4/2000 | Hwang |
| 6,064,794 | A | 5/2000 | McLaren et al. |
| 6,118,450 | A | 9/2000 | Proehl et al. |
| 6,118,817 | A | 9/2000 | Wang |
| 6,128,653 | A | 10/2000 | Del Val et al. |
| 6,133,920 | A | 10/2000 | DeCarmo et al. |
| 6,144,375 | A | 11/2000 | Jain et al. |
| 6,148,304 | A | 11/2000 | De Vries et al. |
| 6,154,771 | A | 11/2000 | Rangan et al. |
| 6,166,314 | A | 12/2000 | Weinstock et al. |
| 6,169,843 | B1 | 1/2001 | Lenihan |
| 6,173,317 | B1 | 1/2001 | Chaddha et al. |
| 6,204,840 | B1 | 3/2001 | Petelycky et al. |
| 6,215,910 | B1 | 4/2001 | Chaddha |
| 6,230,172 | B1 | 5/2001 | Purnaveja et al. |
| 6,233,389 | B1 | 5/2001 | Barton et al. |
| 6,332,147 | B1 * | 12/2001 | Moran et al. ................. 715/203 |
| 6,345,293 | B1 | 2/2002 | Chaddha |
| 6,392,651 | B1 | 5/2002 | Stradley |
| 6,424,792 | B1 | 7/2002 | Tsukagoshi |
| 6,453,336 | B1 | 9/2002 | Beyda |
| 6,622,171 | B2 | 9/2003 | Gupta et al. |
| 6,665,308 | B1 | 12/2003 | Rakib et al. |
| 7,096,271 | B1 | 8/2006 | Gupta et al. |

FOREIGN PATENT DOCUMENTS

| | | |
|---|---|---|
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 12/1997 |
| WO | WO 94/01964 | 1/1994 |
| WO | WO 98/37698 | 8/1998 |

OTHER PUBLICATIONS

Internet Reference "An Annotated Bibliography of Interactive Speech User Interface by Barry Arons," http://barons.www.media.mit.edu/people/barons/AronsAnnotatedBibliography.html, date unknown.

H.J. Chen et al., "A Scalable Video-on-Demand Service for the Provision of VCR-Like Functions," IEEE, May 15, 1995, pp. 65-72.

John David N. Dionisio and Alfonso F. Cardenas, "A Unified Data Model for Representing Multimedia, Timeline, and Simulation Data," IEEE Transactions on Knowledge and Data Engineering, vol. 10, No. 5, Sep./Oct. 1998, pp. 746-767.

Microsoft Corporation and RealNetworks, Inc., "Advanced Streaming Format (ASF) Specification," Feb. 26, 1998, Public Specification Version 1.0, 55 pages.

Informedia—Internet References, http://www.informedia.cs.cmu.edu [last accessed Dec. 20, 1996].

"GSM Full Rate Speech Transcoding," ETSI/PT 12, Feb. 1992, pp. 1-93.

Vary, P. et al., "Speech Codec for the European Mobile Radio System," 1998, pp. 227-230.

Hardman, Lynda et al, "Multimedia authoring paradigms," Authoring and Application of Hypermedia-Based User-Interfaces, IEE Colloquium on, The Institution of Electrical Engineers 1995, pp. 8/1-8/3.

* cited by examiner

MULTIMEDIA TIMELINE MODIFICATION IN NETWORKED CLIENT/SERVER SYSTEMS

RELATED APPLICATIONS

The present application is a continuation of U.S. patent application Ser. No. 09/153,664, filed Sep. 15, 1998, now U.S. Pat. No. 6,622,171 issued Sep. 16, 2003, entitled "Multimedia Timeline Modification in Networked Client/Server Systems."

TECHNICAL FIELD

This invention relates to networked client/server systems and to methods of streaming and rendering multimedia content in such systems.

BACKGROUND OF THE INVENTION

Multimedia streaming—the continuous delivery of synchronized media data like video, audio, text, and animation—is a critical link in the digital multimedia revolution. Today, streaming media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file: text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

In comparison to text-based or paper-based presentations, streaming multimedia presentations are very effective in certain situations. Audio/visual presentations, for example, are able to capture and convey many subtle factors that are not perceivable from paper-based documents. Even when the content is a spoken presentation, an audio/visual recording captures gestures, facial expressions, and various speech nuances that cannot be discerned from text or even from still photographs.

Although streaming multimedia content compares favorably with textual content in most regards, one disadvantage is that it requires significant time for viewing. It cannot be "skimmed" like textual content. Thus, information consumers are forced to choose between the efficiency of the written word and the richness of the multimedia experience.

The invention described below addresses this disadvantage of prior art streaming multimedia content, allowing more efficient multimedia perusal of streaming multimedia presentations than has previously been possible.

SUMMARY OF THE INVENTION

The invention utilizes time-scale modification so that a user can vary the speed of streaming content without destroying its intelligibility. In accordance with the invention, a user selects multimedia content from a menu presented at a network client computer. In addition, the user selects a speed factor, indicating the speed at which the multimedia should be rendered relative to its default speed.

In response to these selections by the user, the network client contacts a network server and initiates a composite media stream from the server to the client. As it receives the media stream, the client processes the individual media streams of the composite stream, altering their timelines in accordance with the user's speed designation. Time-scale modification techniques are used to alter audio streams to maintain their original pitch.

In alternative embodiments, timelines are altered at the server, before streaming to the client. To accomplish this, the server either alters the timelines dynamically, as specific content is requested, or selects from a number of pre-stored media streams having pre-altered timelines.

The invention includes methods of adapting to limited bandwidth situations by composing or selecting composite streams having differing degrees of quality, and/or by composing or selecting streams with timelines that are altered to closely correspond with whatever speed factor has been chosen. In one embodiment of the invention, certain media streams, such as audio streams, take precedence over other streams such as video streams. In this embodiment of the invention, the audio stream is sent with an unaltered timeline, at a rate sufficient to satisfy the consumption requirements of the client, given the current speed factor. The video is then degraded in quality to reduce its bandwidth, so that it can be streamed in whatever bandwidth is not require by the audio.

DETAILED DESCRIPTION

General Network Structure

Figure 1:
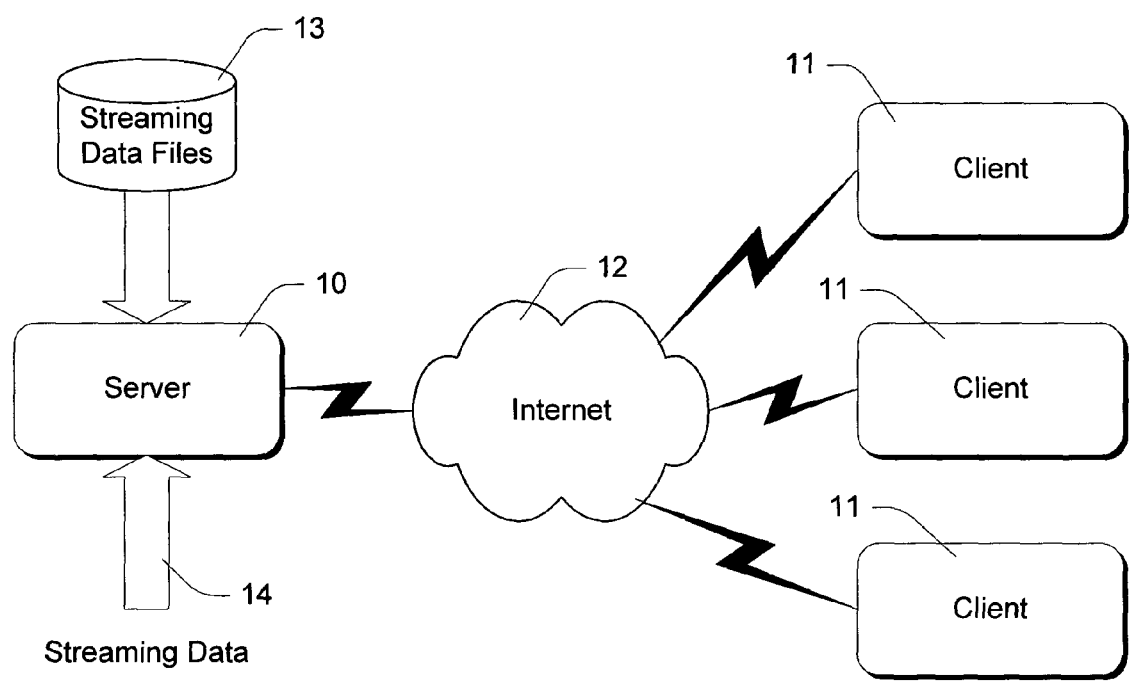
FIG. 1 is a block diagram of a networked client/server system in accordance with the invention.

FIG. 1 shows a client/server network system and environment in accordance with the invention. Generally, the system includes a network server computer 10 and a plurality of network client computers 11. The computers communicate with each other over a data communications network. The communications network in FIG. 1 comprises a public network 12 such as the Internet. The data communications network might also include local-area networks and private wide-area networks.

Server computer 10 has access to streaming media content in the form of different composite media streams. Some composite media streams might be stored as files in a database or other file storage system 13. Other composite media streams might be supplied to the server on a "live" basis from other data source components through dedicated communications channels or through the Internet itself.

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data streams of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes the presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like. In a distributed computer environment, program modules may be located in both local and remote memory storage devices.

Figure 2:
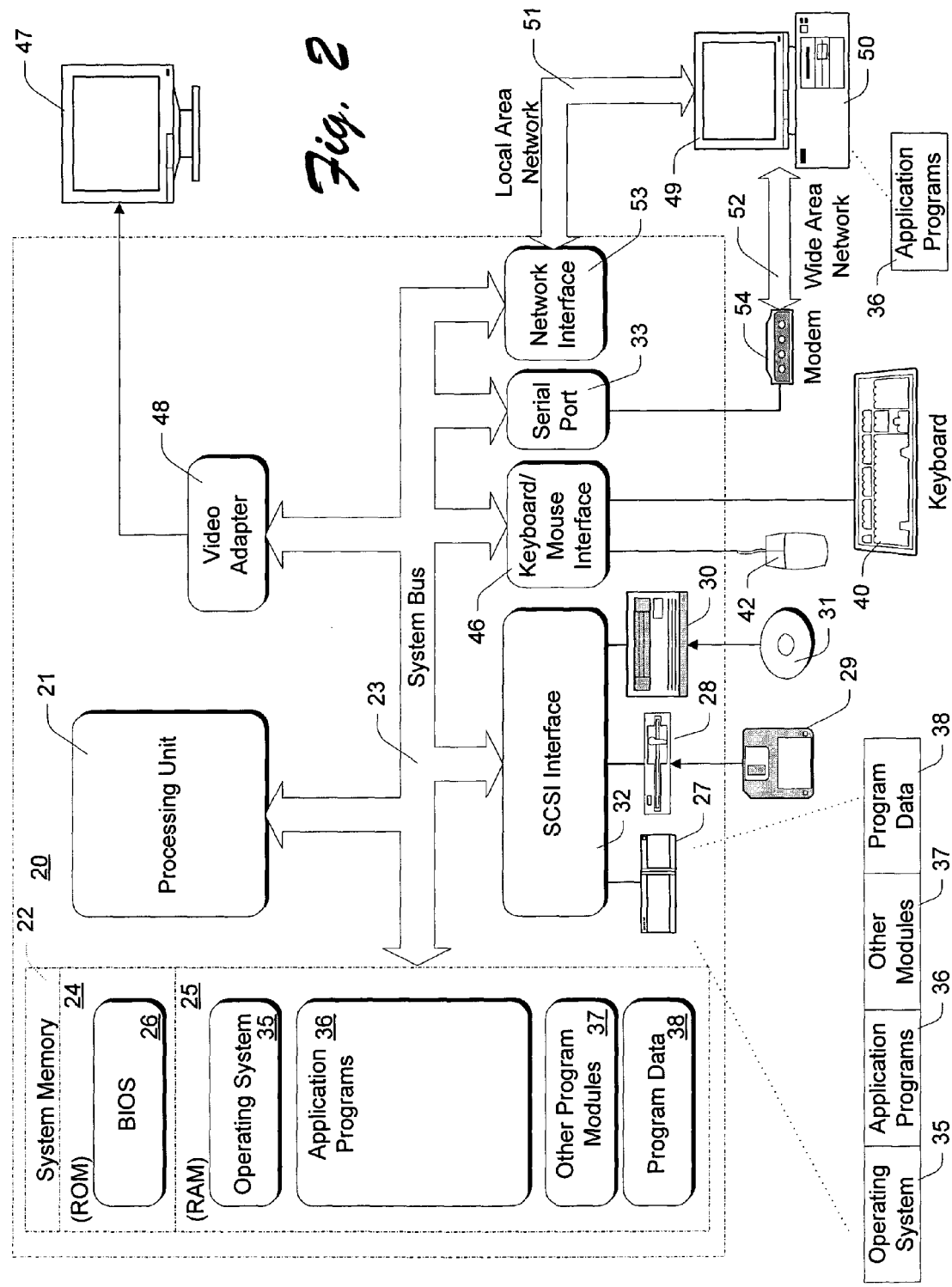
FIG. 2 is a block diagram of a networked computer that can be used to implement either a server or a client in accordance with the invention.

FIG. 2 shows a general example of a computer 20 that can be used as a network node or host in accordance with the invention. Computer 20 is shown as an example of a computer that can perform the functions of either server computer 10 or a client computer 11.

Computer 20 includes one or more processors or processing units 21, a system memory 22, and a system bus 23 that couples various system components including the system memory to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within server computer 20, such as during start-up, is stored in ROM 24. Computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client-Based Multimedia Time-Scale Modification

As shown in FIG. 1, a network system in accordance with the invention includes a network server 10 from which a plurality of composite media streams are available. In some cases, the composite media streams are actually stored by server 10. In other cases, server 10 obtains the composite media streams from other network sources or devices.

The system also includes network clients 11. Generally, the network clients are responsive to user input to select or request identified composite media streams. In response to a request for a composite media stream, server 10 streams the requested composite media stream to the network client in accordance with some known format such as ASF. The client renders the data streams to produce the multimedia content.

In accordance with the invention, a network client also accepts a speed designation from a human user. The speed designation is preferably a speed factor relative to the original or default playback speed of the selected multimedia stream. For example, a speed factor of 1.2 indicates that the composite media stream is to be rendered at 1.2 times its original or default speed, thereby achieving time compression. A speed factor of 0.8 indicates that the composite media stream is to be rendered at 0.8 times its original or default speed, thereby achieving time expansion.

In response to the speed designation from the user, the system modifies the timelines of the individual media streams of the composite media stream, while keeping the timelines synchronized with each other and while maintaining the original pitch of any audio produced from audio streams. In one embodiment of the invention, such timeline modification is performed by the network client. In other embodiments of the invention, the timeline modification can be performed at the network server, before the media streams are streamed to the network client.

Timeline modification changes the timeline of the received data streams in accordance with the user speed designation to achieve either time compression or time expansion. With some types of media, such as video streams, this involves either omitting selected frames or modifying the presentation times of the individual data units or video frames. In other cases, such as with audio streams, the time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

The methods mentioned above are considered "linear" because all portions of the speech signal are compressed or expanded uniformly. Other methods are considered non-linear because they non-uniformly remove portions of the time signal. One example of a non-linear time-compression method is referred to as pause removal. When using this method, a speed processing algorithm attempts to identify and remove any pauses in a recording. The embodiments described herein implement linear time-scale modification, although non-linear time-scale modification techniques can also be utilized.

More information regarding audio time modification is given in an article that appeared in the March, 1997, issue of "ACM Transactions on Computer-Human Interaction" (Volume 4, Number 1, pages 3-38) (1997). For purposes of this disclosure, it can be assumed that audio time modification involves some combination of changing individual data stream samples, dropping certain samples, and adjusting presentation times of any samples that are actually rendered.

Figure 3:
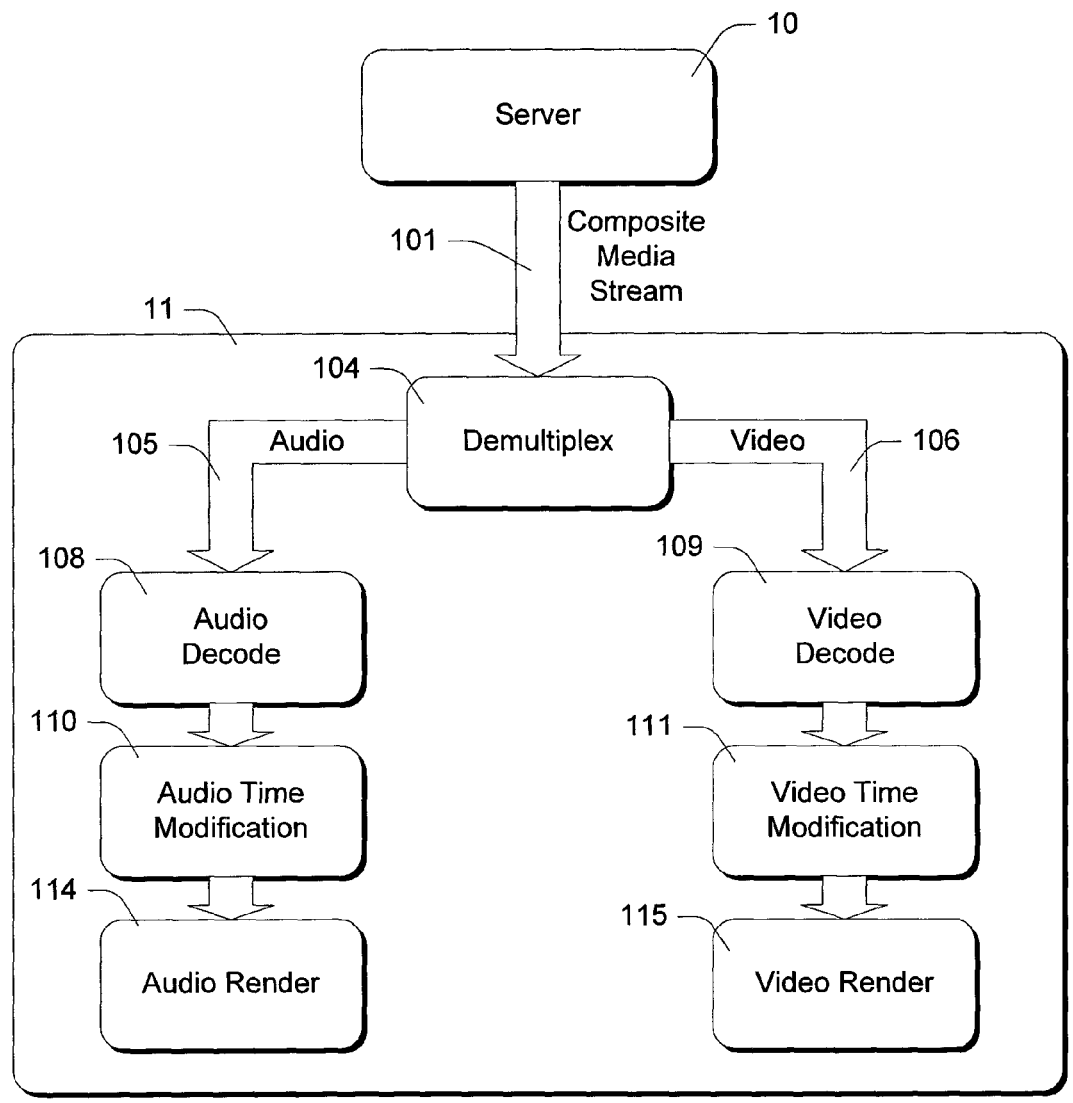
FIG. 3 is a block diagram illustrating communications and rendering of a composite media stream in accordance with the invention.

FIG. 3 illustrates an embodiment of the invention in which timeline modification is performed by network client 11. Network server 10 streams a composite media stream 101 to network client 11 (although not shown in FIG. 3, other communications also take place bi-directionally between server 10 and client 11, such as control-oriented communications). In addition to communications of the media stream 101, there are various control communications between the server The composite media stream has a plurality of individual media streams as described above. For purposes of discussion, it is assumed in this example that the composite media stream has an audio stream and a video stream.

Each media stream has a timeline, and the timelines of the individual streams are synchronized with each other so that the streams can be rendered in combination to produce coordinated multimedia content at the network client 11. The original timelines correspond to the original recording or rendition of the multimedia material, so that rendering the streams according to their timelines results in presentation speeds that closely match the speed of the original event or performance. In the case of audio streams, the timelines preserve the original speed and pitch of the original audio content.

The client computer has a demultiplexer component 104 that receives the composite media stream and that separates out the individual media streams from the composite format in which the data is streamed (such as ASF). This results in an audio stream 105 and a video media stream 106. The individual media streams are sent to and received by respective decoders 108 and 109 that perform in accordance with the particular data format being employed. For example, the decoders might perform data decompression.

The decoded data streams are then sent to and received by time modification components: an audio timeline modification component 110 and a video timeline modification component 111. These components receive input from a human operator in the form of a speed designation as described above. The timeline modification components change the timelines of the received media streams in accordance with the user speed designation to achieve either linear time compression or linear time expansion. With some types of media, such as video streams, this involves either omitting selected frames or modifying the presentation times of the individual data units or video frames. In other cases, such as with audio streams, some type of audio processing technique as the SOLA technique described above is used to time-compress or time-expand audio streams, while maintaining the original pitch of the audio and to also retain the intelligibility of the audio.

The timeline modification components 110 and 111 produce individual media streams that are provided to and received by respective renderers 114 and 115. The rendering components render the streams in accordance with their modified timelines, as the streams continue to be streamed from the network server. In alternative embodiments of the invention, timeline modification components 110 and 111 might be eliminated and their functions performed by decoders 108 and 109.

Note that the speed designation, provided by the user, dictates the rate at which the network client consumes the composite data stream. Because of this, the client communicates the speed designation to the network server when requesting a particular composite media stream. The server responds by streaming the composite media stream at a rate that depends on or is proportional to the speed designation provided by the user. For example, for a speed factor of 2.0, the client consumes data at twice the normal rate. Accordingly, the server streams the composite media stream at twice its normal rate to meet the demands of the client.

In the described embodiment, the user is allowed to change the speed designation during rendering of the composite media stream. In some cases, however, it may not be possible to change the playback speed without interrupting the playback momentarily. If this is the case, playback resumes as soon as possible, beginning at a point that shortly precedes the point at which playback was discontinued. Thus, there is some overlap in the presentation—when the presentation resumes, the overlap provides context for the new content that follows.

Figure 4:
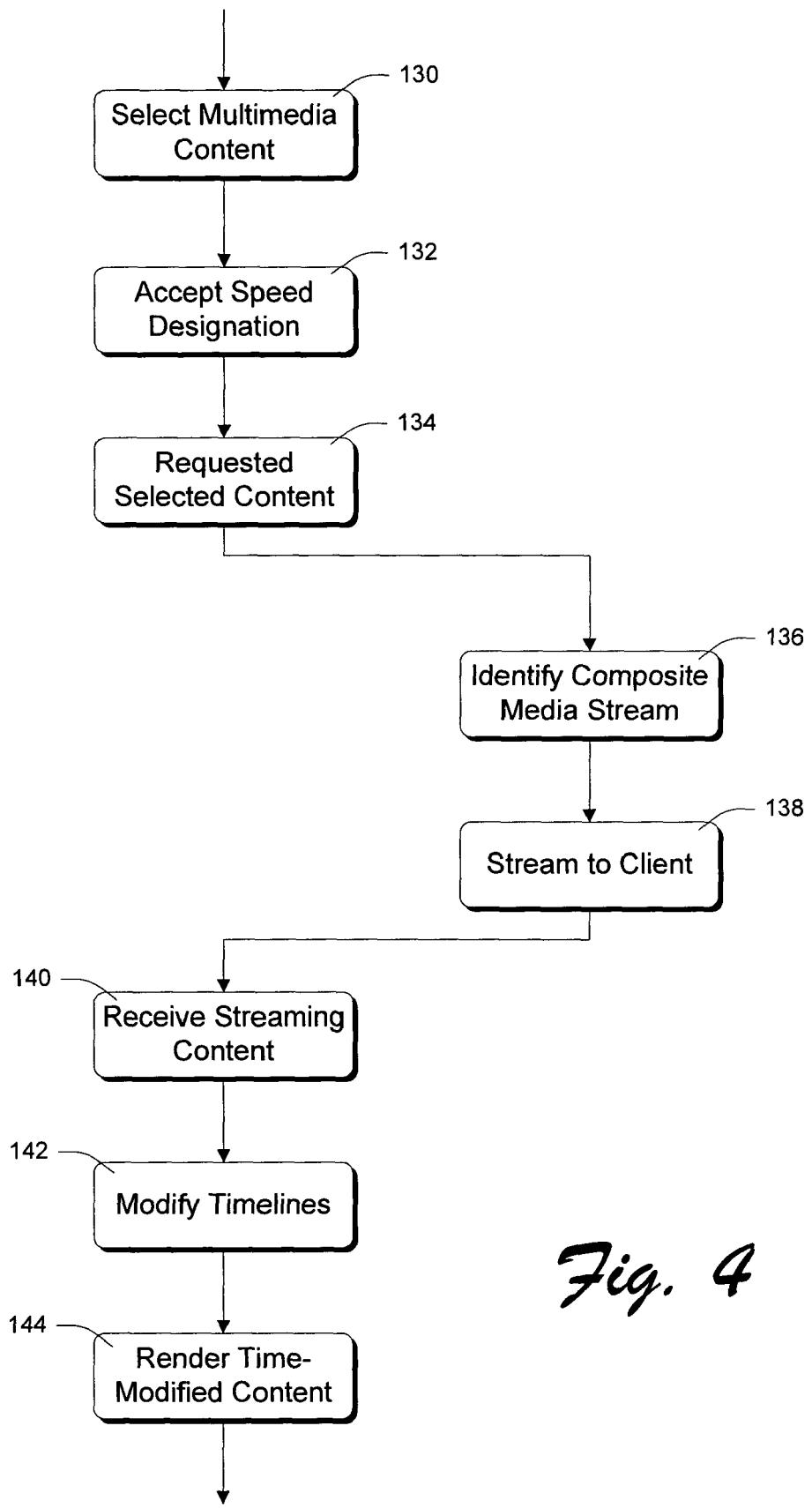
FIG. 4 is a flowchart illustrating methodological aspects of the invention.

FIG. 4 illustrates methodological aspects of the invention. Steps performed at network client 11 are shown on the left-hand side of the figure, while steps performed by network server 10 are shown on the right-hand side of the drawing.

A step 130 comprises selecting multimedia content from the network server to be rendered at the network client. In most cases, a user performs this selection from a menu of available content or via a URL (uniform resource locator) selection. The content will normally be represented by a single composite media stream. In some cases, different media streams might be available for a particular content segment, varying perhaps in quality and in required bandwidth. Preferably, however, the user is unaware of anything except the simple act of selecting a single topic or composite stream.

A step 132 comprises accepting a speed designation from a human user. This step is independent of the previous step of selecting the content itself. Furthermore, the user can vary the speed designation at any time during presentation of the selected content, without having to re-select the content.

A step 134 comprises requesting the selected content from the server at a speed which will satisfy the requirements of the user's speed designation.

A step 136, performed by server 10, comprises identifying the particular composite media stream corresponding to the selected content. Step 138 comprises streaming the composite media stream to the client. In this embodiment, the composite media stream has its original timeline, which does not necessarily result in the speed that the user has designated for playback.

Step 140, performed by the client, comprises receiving the streaming content. Step 142 comprises modifying the timeline of the composite media stream in accordance with the speed designation provided by the user. As described above, this involves modifying the timelines of the individual media streams while maintaining their synchronization and intelligibility. Step 144 comprises rendering the composite media stream in accordance with its modified timeline.

User Experience

The functionality described above is exposed through an application program executed at network client 11, referred to herein as a streaming multimedia player. The streaming multimedia player may be incorporated into the operating system or run as a separate, self-contained application. In either case, the streaming multimedia player operates in a graphical user interface windowing environment such as provided by the "Windows" brand of operating systems, available from Microsoft Corporation of Redmond, Wash.

Figure 5:
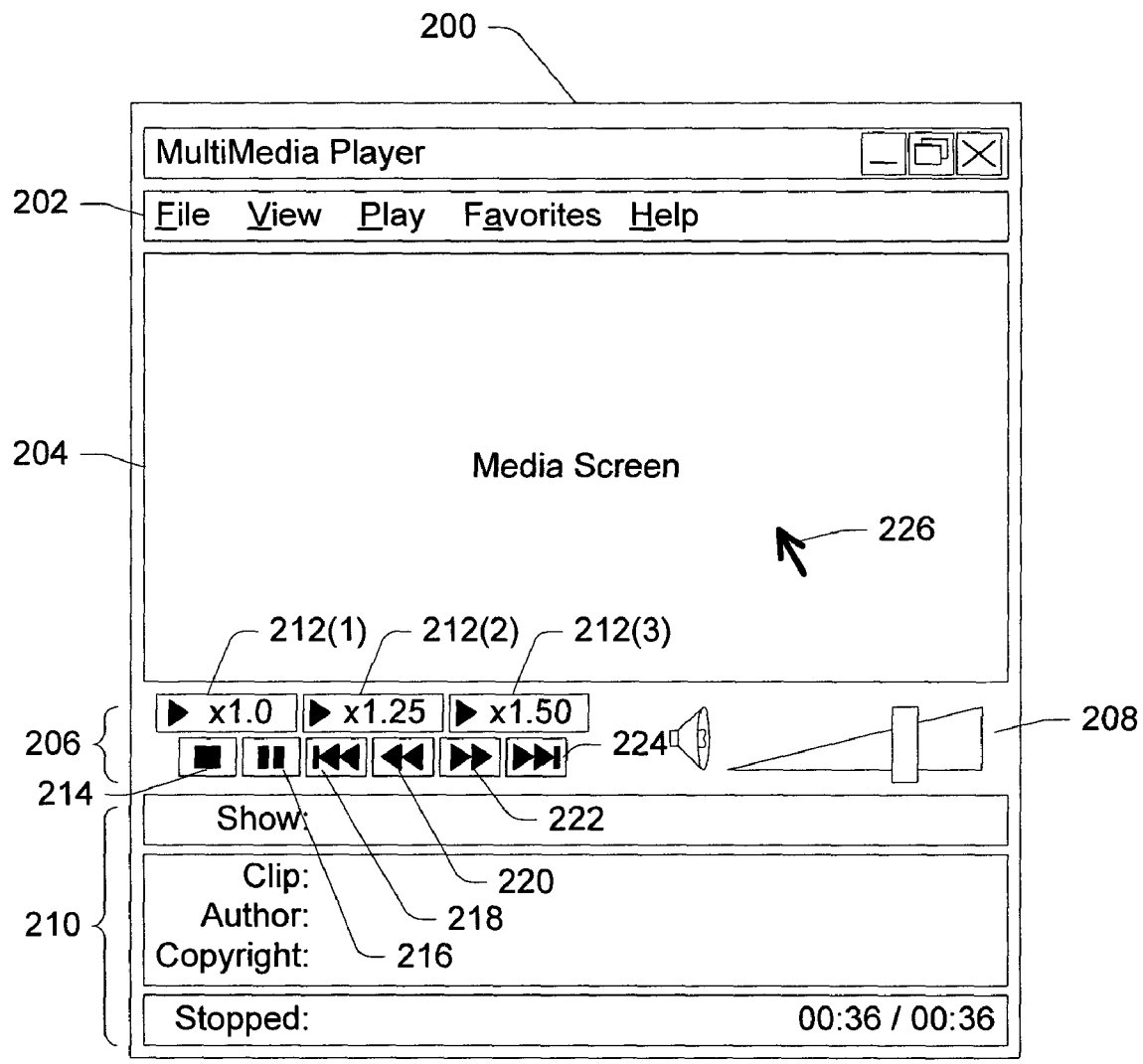
FIG. 5 is a diagrammatic illustration of a graphical user interface window having a time-scale-modification tool for changing a playback speed of streaming multimedia content according to one implementation.

FIG. 5 shows one implementation of a graphical user interface window 200 for the multimedia player. This UI window 200 has a command bar 202, a media screen 204, shuttle controls 206, a volume control 208, and content information space 210. Command bar 202 lists familiar UI commands, such as "File", "View", and so forth.

Media screen 204 is the region of the UI within which the multimedia content is rendered. For video content, the video is displayed on screen 204. For non-visual content, screen 204 displays static or dynamic images representing the content. For audio content, for example, a dynamically changing frequency wave that represents an audio signal is displayed in media screen 204.

Shuttle controls 206 enable the user to control play of the multimedia content. Shuttle controls 206 include multiple play buttons 212(1), 212(2), and 212(3), a stop button 214, a pause button 216, rewind buttons 218 and 220, and fast forward buttons 222 and 224.

Play buttons 212(1)-212(3) are associated with different playback speeds of the multimedia content. In this illustration, play button 212(1) corresponds to a normal playback speed (i.e., "×1.0"), play button 212(2) corresponds to a faster playback speed with a speed up factor of 25% (i.e., "×1.25"), and play button 212(3) corresponds to an even faster playback speed with a speed up factor of 50% (i.e., "×1.50"). It is noted, however, that more or less than three buttons may be used (e.g., two, four, five, etc.) and may correspond to speeds both above and below the normalized speed of "×1.0".

The user can actuate one of the play buttons via a UI actuation mechanism, such as a pointer 226 or by tabbing to the desired play button and hitting the "enter" key. Upon selection of a play button, the multimedia player plays the multimedia content at the playback speed associated with the selected play button. For instance, if the user selects play button 212(2) with a 25% speedup factor, the multimedia player plays the content at a playback speed of 1.25 times the original or default playback speed.

Once the multimedia content is playing at one speed, the user is free to select a new speed by actuating another of the play buttons 212(1)-212(3). Suppose the user decides to slow the content back to normal speed. The user can actuate the "×1.0" play button 212(1) to return the media content to the normal speed. In response to speed changes, the multimedia player is configured to repeat a portion of the multimedia content at the new speed.

Content information space 210 lists information pertaining to the multimedia content being rendered on the media screen 204. The content information space includes the show name, author and copyright information, and tracking/timing data.

Figure 6:
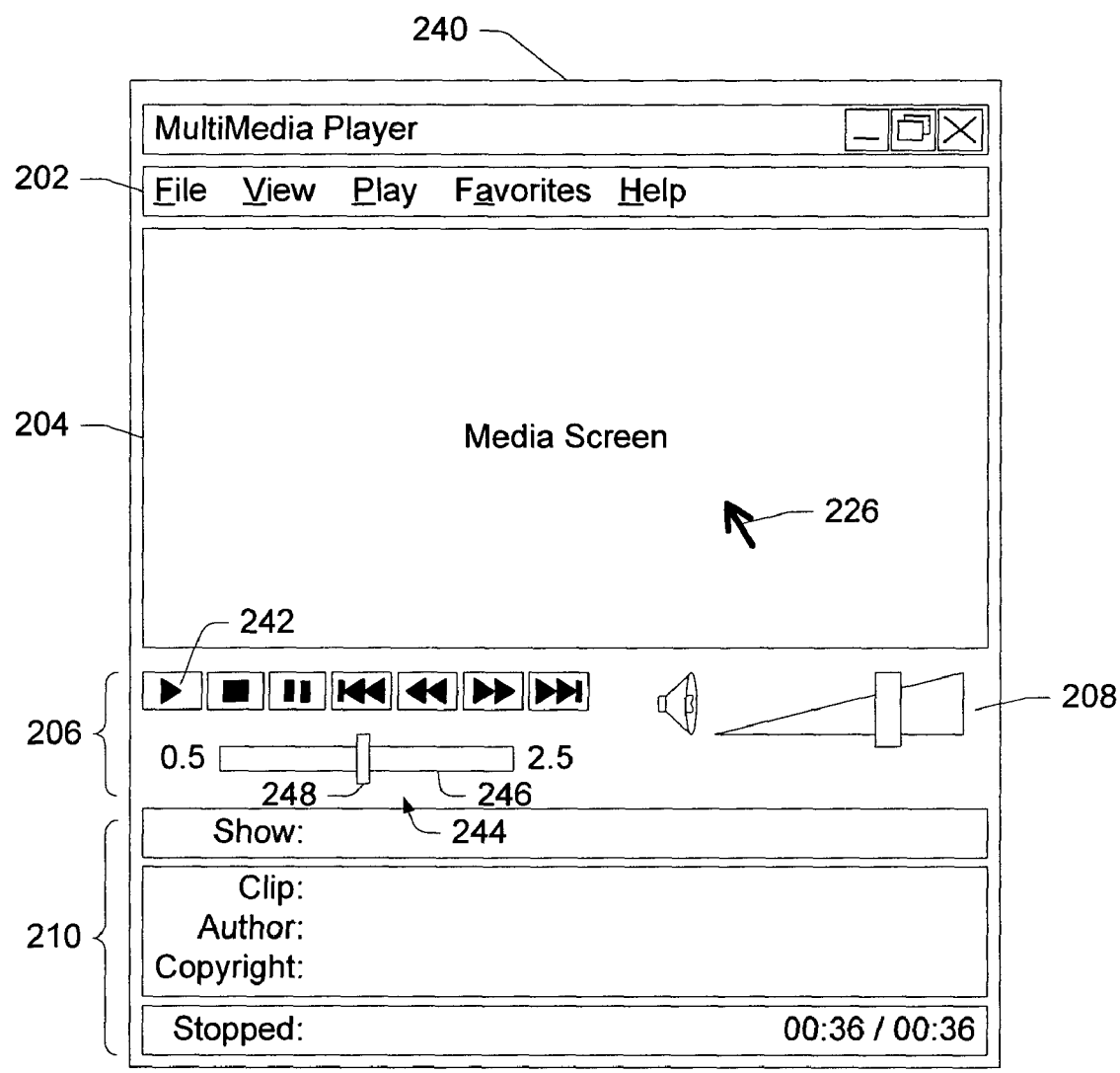
FIG. 6 is a diagrammatic illustration of a graphical user interface window having a time-scale-modification tool according to a second implementation.

FIG. 6 shows another implementation of a graphical user interface window 240 for the multimedia player. Like UI 200 of FIG. 5, UI 240 has command bar 202, media screen 204, shuttle controls 206, volume control 208, and content information space 210. This implementation, however, employs only a single play button 242. Actuation of play button 242 initiates play of the multimedia content.

UI 240 has a scale mechanism 244 to vary the speed of the content during rendering. The scale mechanism has a range of playback speeds 246, which in this example range from 0.5× to 2.5× the normal speed. Scale mechanism 244 also has a movable slider 248 that is movable over the range 246. The user can position the slider 248 at the desired speed at which the multimedia player is to play the multimedia content.

In the FIG. 6 illustration, range 246 is a continuous range from a high playback speed (i.e., 2.5×) to a low playback speed (i.e., 0.5×). Slider 248 moves continuously over the range. In other implementations, range 246 is a discrete range of discrete playback speeds (e.g., 0.5×, 1.0×, 1.5×, 2.0×, and 2.5×) and the slider is movable among the discrete playback speeds.

Once the multimedia content is playing at one speed, the user is free to select a new speed by moving the slider 248 to a new speed. In response to use manipulation of the scale mechanism, the multimedia player repeats a portion of the multimedia content and begins playing at the new speed.

Figure 7:
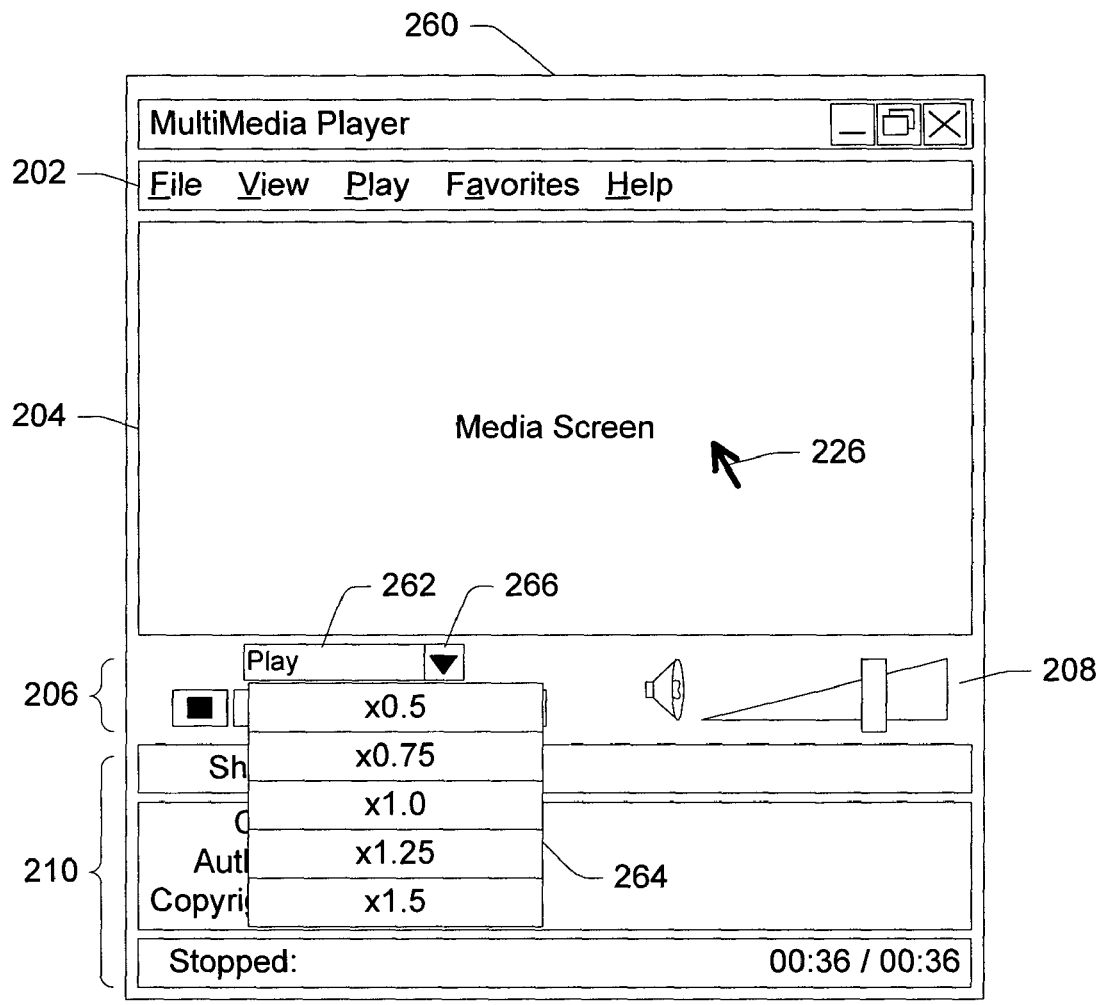
FIG. 7 is a diagrammatic illustration of a graphical user interface window having a time-scale-modification tool according to a third implementation.

FIG. 7 shows a third implementation of a graphical user interface window 260 for the multimedia player. In this implementation, UI 260 has a single play button 262 to initiate playback of the multimedia content. UI 260 also has a menu 264 associated with the play button. In this illustration, menu 264 is a drop-down or pull-down menu that opens beneath the play button in response to actuation of a tab 266 adjacent to the play button. Alternatively, menu 264 may be invoked by placing pointer 226 over play button 262 and right clicking a mouse button.

Menu 264 lists multiple playback speeds from which a user can select. In the illustrated example, five playback speeds are listed: ×0.5, ×0.75, ×1.0, ×1.25, and ×1.5. The user can select one of the listed speeds to instruct the multimedia player to play the multimedia content at a desired speed. As noted above, the user can select a new speed after the content has begun playing by invoking the menu and selecting the new speed. In response, the multimedia player repeats a portion of the multimedia content and begins playing at the new speed.

Server-Based Multimedia Time-Scale Modification

In various embodiments of the invention, the step of modifying the timeline of the requested multimedia content can be performed in the client as described above, in the server, or in both the client and server. In the network environment, it is desirable to avoid performing any significant timeline modification in the server. Otherwise, the server could quickly become overloaded with requests from multiple clients.

However, in some cases it may be desirable to store multiple versions of media streams at a server and to select particular versions of the media streams depending on the timeline requirements of the client, as designated by the user. One advantage of this method is that is can require comparatively less communications bandwidth between the server and client.

As a general example, a server might store a plurality of media streams having timelines modified by different factors. When a client requests a composite media stream, the server selects the version of the media stream whose timeline most closely accords with the speed designation set by the user. If the timeline does not exactly match the speed designation, the client can perform further timeline modification.

Figure 8:
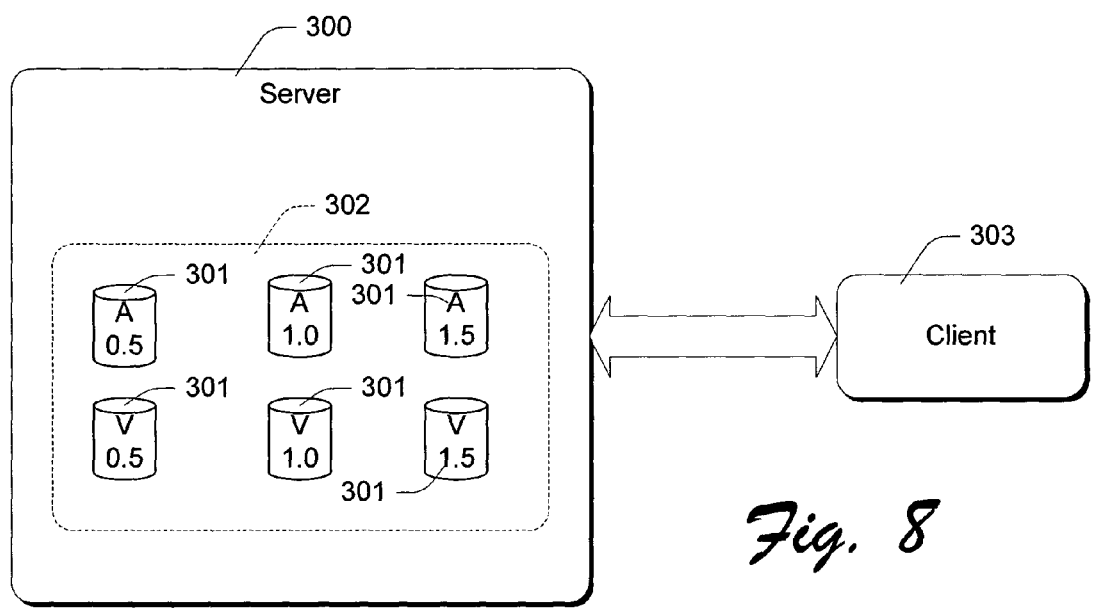
FIG. 8 is a block diagram illustrating one embodiment in which a plurality of timeline-altered media streams are stored at and provided from a server.

FIG. 8 illustrates a more specific example. In this embodiment, a server 300 stores multiple media streams 301 corresponding to specific multimedia content 302. The media streams are of different types, such as audio and video. In FIG. 8, audio streams are designated by the letter "A" and video streams are designated by the letter "V". Any combination of a single audio stream and a single video stream can be rendered to produce the multimedia content.

The various individual data streams have timelines that are modified by different degrees. The speed factors are indicated in FIG. 8. In this embodiment, the audio and corresponding video streams are organized as pairs, each pair forming a composite media stream having a timeline that has been modified by a factor of 0.5, 1.0, or 1.5.

When a client 303 requests multimedia content from server 300, the client identifies both the content and the speed factor. In response, the server selects the audio and video streams that have timelines most closely approximating the identified speed factor, and combines those individual media streams to form the composite media stream. The resulting composite media stream is then sent to the client. When the timeline is accelerated, this saves bandwidth in comparison to sending an unaltered composite media stream having a higher streaming rate to meet the accelerated consumption demands of the client.

As a further optimization, the server can store composite media streams having different degrees of timeline modification and different degrees of quality. Generally, a media stream of a lower quality will consume less communications bandwidth than a media stream of a higher quality. Before selecting an appropriate media stream, the server determines the available bandwidth between the server and the client. It then selects a combination of individual media streams that provides the best quality while requiring no more than the available bandwidth.

When the user changes the playback speed, the client requests a new media stream that most closely corresponds to the requested speed. Playback is resumed in the new stream at the same point (relative to the subject content) at which it was discontinued in the old stream. Thus, the new stream is initiated at some intermediate point rather than at the beginning. When the streams are linearly altered, it is not difficult to determine the appropriate presentation time in the new stream. Specifically, the point in the new timeline equals oldtime(oldfactor/newfactor), where oldtime is the presentation time in the first media stream at which the speed change is to occur, oldfactor is the playback speed or factor of the old media stream, and newfactor is the playback speed or factor of the new media stream.

Figure 9:
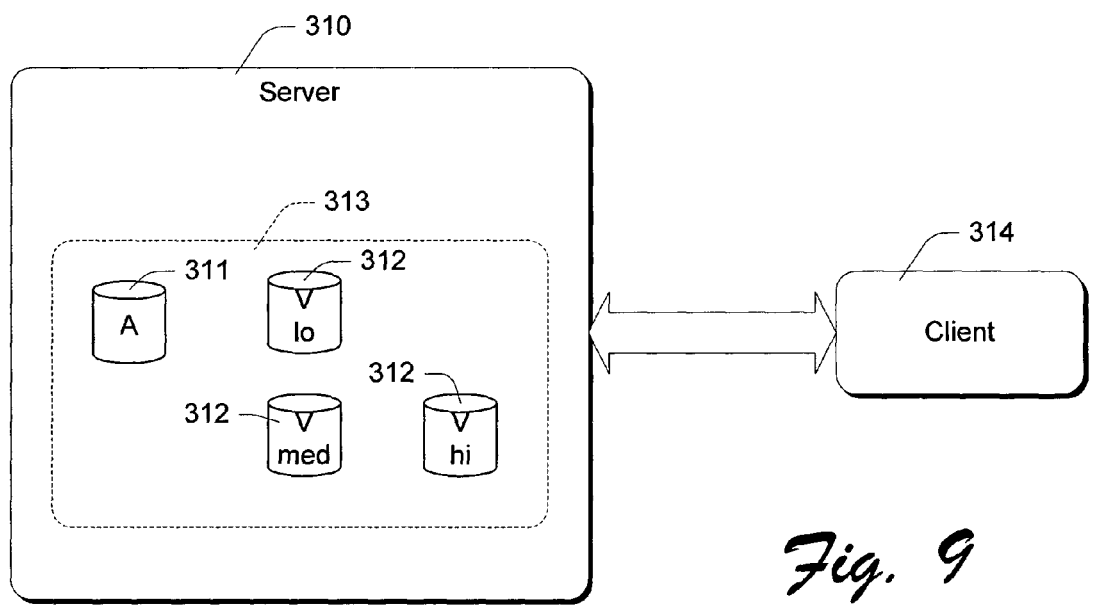
FIG. 9 is a block diagram illustrating another embodiment in which a plurality of timeline-altered media streams are stored at and provided from a server.

FIG. 9 illustrates a further example utilizing this concept. In this case, a server 310 has stored a single audio stream 311 and multiple video streams 312, all corresponding to a single multimedia segment 313. The video streams different in quality and corresponding required bandwidth: low (lo), intermediate (med), and high (hi). However, the video streams all have a common, unmodified timeline.

When a client 314 requests the multimedia content from server 310, the server determines or notes both the speed factor designated by the user and the available bandwidth. It then selects the video stream that has best available quality while also requiring no more bandwidth (at the requested speed factor) than the difference between the available bandwidth and the bandwidth consumed by the selected audio stream. Again, this allows the system to compensate for various available bandwidths.

Figure 10:
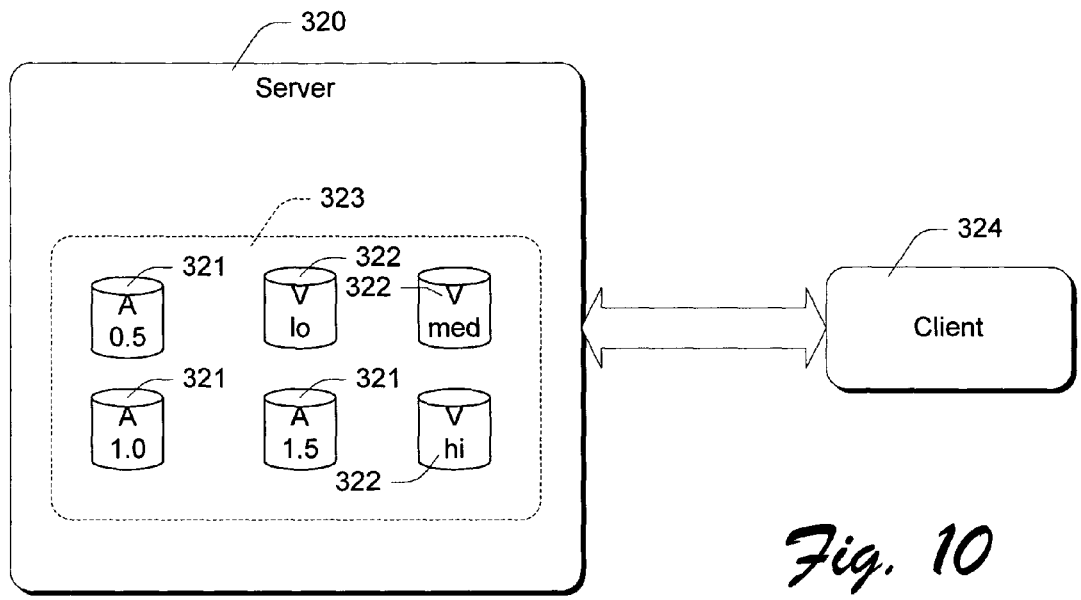
FIG. 10 is a block diagram illustrating yet another embodiment in which a plurality of timeline-altered media streams are stored at and provided from a server.

FIG. 10 shows another example, in which a server 320 has stored multiple audio streams 321 and multiple video streams 322, all corresponding to a single multimedia segment 323. The audio streams differ in the degree by which their timelines have been modified. In this example, there are audio streams having timelines modified by factors of 0.5, 1.0, and 1.5. The video streams differ in quality and corresponding required bandwidth: low (lo), intermediate (med), and high (hi). However, the video streams all have a common, unmodified timeline.

When a client 324 requests the multimedia content from server 320, the server determines or notes both the speed factor designated by the user and the available bandwidth. It then selects an audio stream that most closely accords with the specified speed factor. It then selects the video stream that has best available quality while also requiring no more bandwidth than the difference between the available bandwidth and the bandwidth consumed by the selected audio stream. Again, this allows the system to compensate for various available bandwidths.

Figure 11:
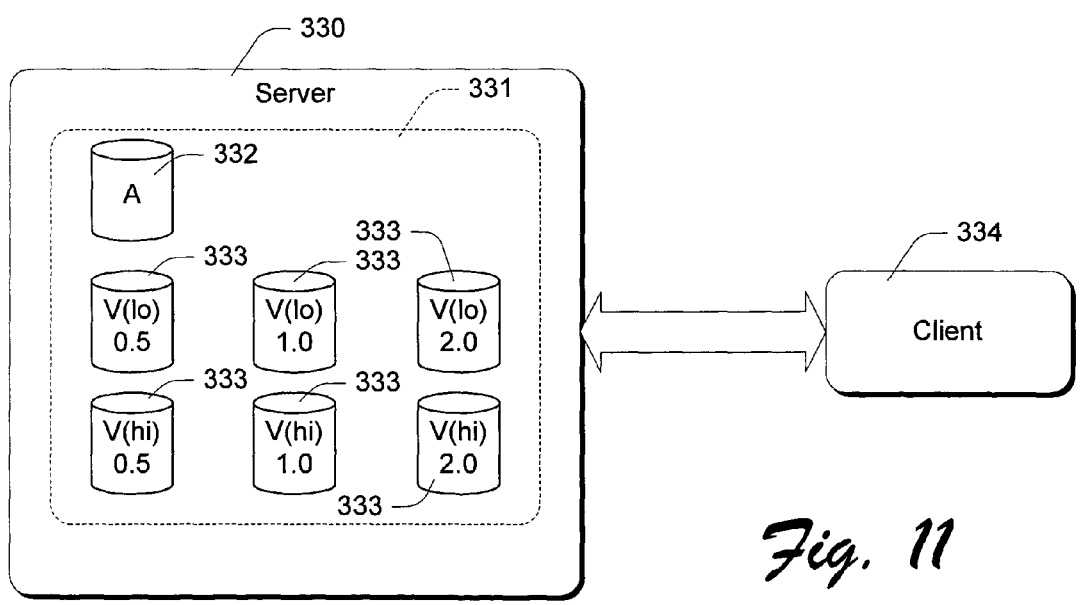
FIG. 11 is a block diagram illustrating yet another embodiment in which a plurality of timeline-altered media streams are stored at and provided from a server.

FIG. 11 illustrates yet another embodiment in which multiple media streams are stored at the server for use depending upon available bandwidth and upon the speed factor designated by the user. In this embodiment, a server 330 stores a single audio stream 332 and a plurality of video streams 333, all corresponding to and representing the same multimedia content 331. The audio stream has an unaltered timeline. However, the video streams have different timelines and also vary by quality and corresponding bandwidth requirements. Specifically, in this example the video streams have timelines modified by factors of 0.5, 1.0, and 2.0. For each speed factor, there is a "low" bandwidth video stream having a relatively low quality, and a "high" bandwidth video stream having a relatively high quality.

At a normal, unaltered playback rate, the audio stream utilizes a bandwidth of 16 Kbps (kilobits per second). The low bandwidth video streams require a bandwidth of 20 Kbps. The high bandwidth streams require a bandwidth of 40 Kbps.

Now, suppose that a client requests the multimedia content over a communications channel having a bandwidth of 56 Kbps, at a speed factor of 2.0. At this speed factor, the client consumes audio data at twice the normal rate, which in this case is 32 Kbps. That leaves 24 Kbps of available bandwidth. Accordingly, the server selects the low bandwidth video stream with the timeline modified by a factor of 2.0, and combines it with the audio stream to form a composite media stream for streaming to the client. The total required communications bandwidth is 52 Kbps, which is within the limits of the available bandwidth.

Although the example give with reference to FIG. 11 is relatively specific, this method of bandwidth utilization can be generalized to include other types of media streams. Each stream is assigned a priority. Audio will generally have a high priority. The high-priority streams are given priority when allocating bandwidth. Thus, in the example above, the audio stream is streamed to the client at its full quality, while the video stream is reduced in quality to fit within the remaining bandwidth.

Furthermore, a stream such as a video stream can sometimes be timeline-modified dynamically at the server without incurring significant overhead. Accordingly, the server can adjust the timeline and quality of the video stream dynamically to match the available bandwidth, eliminating the need to store multiple video streams at the server. As an example of a situation where this might be easily accomplished, an MPEG (Motion Picture Expert Group) video stream contains independent frames and several levels of dependent frames. One easy way to reduce bandwidth is to simply drop lower-level dependent frames from the video stream.

Conclusion

The described methods provide efficient ways to accomplish timeline modification in a networked client/server environment. The invention provides a user with a degree of efficiency and convenience that has previously been unavailable. When using the invention, the user can browse or skim through streaming content, thereby reducing the time required to assimilate such content. Furthermore, the invention provides for efficient use of limited bandwidth, thereby maximizing the practical applications of the invention.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of obtaining and presenting multimedia content, comprising the following steps:
providing multiple media streams at a network server corresponding to the multimedia content, the multiple media streams including streams corresponding to at least first and second media types, the media streams of the first media type and of the second media type having timelines, wherein the media streams of the first and second media types can be rendered in combination to produce the multimedia content;
for each of a plurality of different playback speeds,
composing multiple composite media streams that represent the multimedia content for that playback speed with varying quality requiring varying network bandwidth, by
selecting the media stream of the first type and modifying in a linear manner a timeline of the selected media stream of the first type based on that playback speed,
selecting the media stream of the second type and modifying in a non-linear manner a timeline of the selected media stream of the second type based on that playback speed;
for each of the multiple composite media streams for that playback speed and for a quality, composing a composite media stream for the quality from the modified media stream of the first type and the modified media stream of the second type; and
storing at the network server the composite media streams for that playback speed; and
after composing and storing the composite media streams for the different playback speeds, for each of a plurality of network clients,
receiving from the network client a selection of the multimedia content to be rendered at the network client;
receiving from the network client a selection of a speed designation received at the network client from a human user, wherein the speed designation is a speed factor relative to a default playback speed of the selected multimedia content;
selecting one of the plurality of playback speeds that most closely matches the received speed designation; and
streaming the composite media stream for the selected playback speed from the network server to the network client, the composite media stream representing the selected multimedia content;
so that the network client can render the composite media stream based on the speed designation and with the media stream of the first media type synchronized with the media stream of the second media type,
so that the network server can avoid having to compose a composite media stream after receiving a selection from a network client, and
so that communication bandwidth is saved by not having to send the unmodified multimedia content to the network client.

2. A computer-readable storage medium containing a program for streaming multimedia content from a network server to a network client, the program having instructions that are executable by the network server to perform a method for presenting multimedia content, the method comprising:
for each of a plurality of playback speeds,
composing multiple composite media streams representing the multimedia content for the playback speed with varying quality requiring varying network bandwidth, wherein a composite media stream includes a media stream of a first type and a media stream of a second type different from the first type, and includes a timeline that is modified by:
modifying in a linear manner a timeline of the media stream of the first type based on the playback speed;
modifying in a non-linear manner a timeline of the media stream of the second type based on the playback speed, so that the timeline of the media stream of the second type is synchronized with the timeline of the media stream of the first type; and
for each of the multiple composite media streams for that playback speed and for a quality, composing a composite media stream for the quality from the modified timeline of the media stream of the first type and the modified timeline of the media stream of the second type; and
storing at the network server the composite media streams for that playback speed;
after composing and storing the composite media streams for the different playback speeds, for each of a plurality of network clients,
receiving from the network client a speed designation associated with a playback speed of multimedia content at the network client, wherein the speed designation identifies a speed factor relative to a default playback speed of the multimedia content;

selecting one of the plurality of playback speeds that most closely matches the received speed designation; and streaming the composite media stream for the selected playback speed from the network server to the network client so that the network client can render the composite media stream based on the speed designation and with the media stream of the first media type synchronized with the media stream of the second media type, so that the network server can avoid having to compose a composite media stream after receiving a selection from a network client, and so that communication bandwidth is saved by not having to send the unmodified multimedia content to the network client.

3. A method as recited in claim 1, further comprising:

presenting multiple play buttons in a graphical user interface at the network client, the multiple play buttons being associated with different playback speeds of the multimedia content;

enabling the human user to select one of the play buttons;

using, as the speed designation, a playback speed associated with the selected play button.

4. A method as recited in claim 1, further comprising:

presenting a play button in a graphical user interface at the network client;

presenting, in the graphical user interface, a scale mechanism with a range of playback speeds and a movable slider that is movable over the range of playback speeds;

enabling the human user to move the slider to a playback speed within the range;

using, as the speed designation, a playback speed referenced by the slider.

5. A method as recited in claim 1, further comprising:

presenting a play button in a graphical user interface at the network client;

presenting, in the graphical user interface, a menu associated with the play button, the menu listing multiple playback speeds from which the human user can select;

enabling the human user to select a playback speed from the menu; and using, as the speed designation, a playback speed selected from the menu.

6. The method of claim 1 including after receiving from the network client the selection of the multimedia content, determining network bandwidth of the network;

composing a composite media stream from a media stream of the first media type with a first quality whose timeline was modified and from a media stream of the second media type with a second quality whose timeline was modified, the first quality being different from the second quality, wherein the first and second qualities are selected so that the composite media stream does not exceed the available bandwidth.

7. The computer-readable storage medium of claim 2 including after receiving from the network client the selection of the multimedia content, determining network bandwidth of the network;

composing a composite media stream from a media stream of the first type with a first quality whose timeline was modified and from a media stream of the second type with a second quality whose timeline was modified, the first quality being different from the second quality, wherein the first and second qualities are selected so that the composite media stream does not exceed the available bandwidth.

* * * * *